US006233804B1

(12) United States Patent
Fourdraine

(10) Patent No.: US 6,233,804 B1
(45) Date of Patent: May 22, 2001

(54) TOOL FOR CLINCHING TWO MEMBERS TOGETHER

(75) Inventor: John Fourdraine, Toronto (CA)

(73) Assignee: Amisk Technologies Inc., Toronto (CA)

( * ) Notice: Subject to any disclaimer, the term of this patent is extended or adjusted under 35 U.S.C. 154(b) by 0 days.

(21) Appl. No.: 09/313,191

(22) Filed: May 18, 1999

Related U.S. Application Data

(60) Provisional application No. 60/085,811, filed on May 18, 1998.

(51) Int. Cl.[7] ........................ B23P 11/00
(52) U.S. Cl. ........................ 29/243.56
(58) Field of Search ........................ 72/409.01, 409.18; 29/243.56, 243.58, 758, 810, 816, 751

(56) References Cited

U.S. PATENT DOCUMENTS 3,015,824 * 1/1962 Richardson ........................ 29/243.56
4,090,390 * 5/1978 Barinaga ........................ 29/243.56
4,802,271 * 2/1989 Bader ........................ 29/243.56
4,944,177 * 7/1990 Womack ........................ 29/243.56
5,305,628 * 4/1994 Cluggish ........................ 29/243.56

FOREIGN PATENT DOCUMENTS

WO 98/27289 6/1998 (WO) .

* cited by examiner

Primary Examiner—Robert C. Watson
(74) Attorney, Agent, or Firm—Ridout & Maybee

(57) ABSTRACT

A method of clinching two members together is provided together with a tool for performing the clinching operation. A staple is arranged with its web spanning members to be clinched together. The legs of the staple are forced together to effect the clinching. The tool to perform the operation is a pair of pincers. Each pincer is pivoted to the end of a spanning bar, the length of which corresponds to the length of the web of the staple to be used. The jaws are shaped to distort the legs of the staple to wrap around sides of members on closing of the jaws.

5 Claims, 6 Drawing Sheets

TOOL FOR CLINCHING TWO MEMBERS TOGETHER

This application claims benefit of Provisional No. 60/085,811, filed May 18, 1998.

BACKGROUND OF THE INVENTION

1. Field of the Invention

This invention relates to progressively clamping a pair of members together to hold them firmly attached to one another. Especially the invention relates to progressively clamping together two vertical struts of adjacent structural panels of a building. The invention also relates to a tool for carrying out the method of progressively clamping a pair of members together.

2. Acknowledgement of Prior Art

International Application No. PCT/CA97/00783 (WO 98/27289) published on Jun. 25, 1998, is directed to a building system including portable prefabricated wall sections having parallel vertical support members. When the building is erected the parallel vertical members of adjacent wall sections are held closely together by clips which can be progressively tightened. The clips are screwed onto the vertical members and, in some circumstances, the heads of the screws can upstand from the clips in a disadvantageous manner. Moreover, although the building system of the above referenced International Patent Application provides a building which is quickly and easily erected by amateurs, the chore of installing and tightening all of the clips is tedious and time consuming.

The present invention provides an alternative method of tightening together the prefabricated wall sections of a building system such as that of International Patent Application No. PCT/CA97/00783. The method may also be used for tightening together other members which it is desired to progressively move together and hold firmly in place.

Staple are widely used for hold articles together. Often, staples may be applied through layers of paper or fabric against a guide surface to clinch the legs of the staples so that the layers of material are held between the clinched legs and the web of the staple. Alternatively in a carpentry environment, staples are forced into a penetrable material such as wood and possibly also through an upper layer of fabric material. In this case, the legs of the staples remain vertical and the staple is held in a similar manner to that of a nail by its forced penetration into the wood. There is no way known to the applicants of applying clinched staples without the use of a backing guide surface to guide the legs of the staples or a backing penetrable surface to hold the legs of the staples. Moreover, there is no known way of utilizing staples so that they are progressively tightened at a rate chosen by the operator.

The present inventor has addressed these problems.

SUMMARY OF THE INVENTION

The present invention provides a method of progressively clamping a pair of members one against the other, the method comprising locating the pair of members in side-by-side relationship, selecting a staple having a web at least as long as the combined width of the side-by-side members, locating the staple with its web abutting the side-by-side members and with its legs extending to either side of the members, clinching the legs of the staple together to wrap around at least part of sides of the members to tighten said members one against the other, the clinching comprising spanning the staple between open jaws of the pincers, the jaws being shaped to wrap around sides of the members and progressively closing the jaws to clinch the staple. Preferably the clinching step is carried out at a controlled rate and may be stopped at any time before maximum clamping is achieved, for example, the staples may be used to loosely hold members together for location purposes. The operator may control the speed of bringing pincer handles together to close the jaws and may choose to stop at any time.

Especially the invention provides, in a method of erecting a building comprising abutting vertical support members of adjacent wall section, a method of progressively clamping side-by-side vertical support members together, comprising selecting a staple having a web longer than the width of the combined side-by-side members, locating the staple with its web abutting the side-by-side members and with its legs extending to either side of the members, clinching the legs of the staple together to bend the inwardly to grip the members to tighten them against each other. Conveniently each staple is of magnetisable material and are located in open jaws of a clinching tool before location with its web abutting the side-by-side members. It may be held in the jaws by a magnetic part of the tool.

Preferably the legs of the staple are longer than the thickness of the side-by-side members so that, when they are pinched together to grip the members and tighten them against each other, the legs wrap around behind the members. In some circumstances, such as when the side-by-side members are wood, especially soft wood, the legs of the staple may be pinched together to bend their distal end portions inwardly to actually penetrate into the wood rather than to wrap around behind the members. The size of the staples is chosen to complement the members which it is desired to tighten together. For example, if it is desired to tighten a pair of 2×4 studs together with their 4 inch faces abutting, then the web of the staple should be slightly more than 4 inches so that the legs of the staple may easily be positioned about the opposed faces of the studs. If on the other hand the members to be joined together are a pair of struts having, say, 1 millimeter width the web of the staple should have a length just over 2 millimeters. Such struts might be used in model building.

Conveniently means is provided for locating the staple in position against the members to be tightened together and for pinching the staple legs together to tighten the members against one another. Accordingly, the invention also provides a tool for holding the staples and for clinching them about the members to be clinched together. The tool comprises a pair of pincers each pincer having a jaw and an elongate handle portion. Each pincer is pivoted to a rigid bar at opposite end portions of the bar. The bar has a length sufficient that the web of a staple may be located thereagainst between the jaws when the pincers are oriented in an open position. The bar has means to hold the web of the staple thereagainst. The jaw of each pincer is curved in a shape to clinch the legs of the staple inwardly toward each other as the pincers are pivoted into a closed position to exert pressure against the legs of the staple with the jaws.

Very suitably, the bar may be magnetic for use with magnetizable staples.

Usually, the tool may comprise pincers pivoted to the bar by a simple pivot so that as the handle portions are pulled apart the pincer portions will close to clinch the staple about the members to be tightened together. In some circumstances, where extra force is required, double pivot points may be provided so that movement of the handle portions towards one another will also cause closing of the pincer portions. Indeed, such an arrangement may be provided for manual convenience rather than for extra force. It is generally considered more convenient to use manual pressure to close handles together than to pull them apart. Where considerable extra force is required the tool may be operated with hydraulic or pneumatic assistance.

BRIEF DESCRIPTION OF THE DRAWINGS

Embodiments of the invention will now be described with reference to the drawings in which.

DETAILED DESCRIPTION OF A PREFERRED EMBODIMENT

Figure 1:
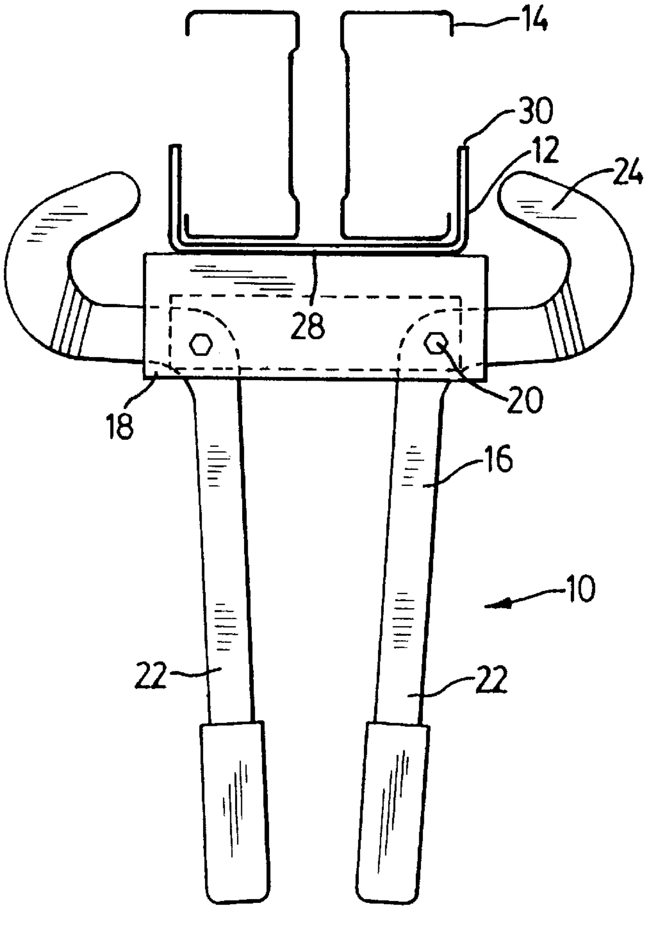
FIG. 1 shows a tool for clinching a staple about two members to be tightened together, the tool being shown with a staple in its jaws in the open position.
Figure 2:
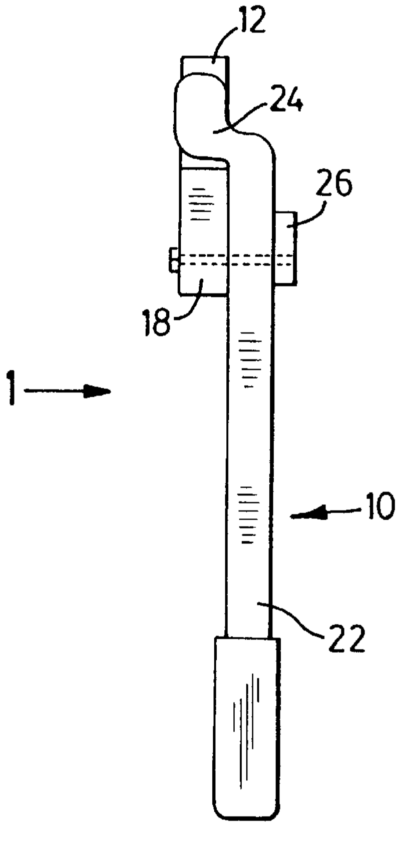
FIG. 2 is a view of the tool of FIG. 1 from the side.
Figure 3:
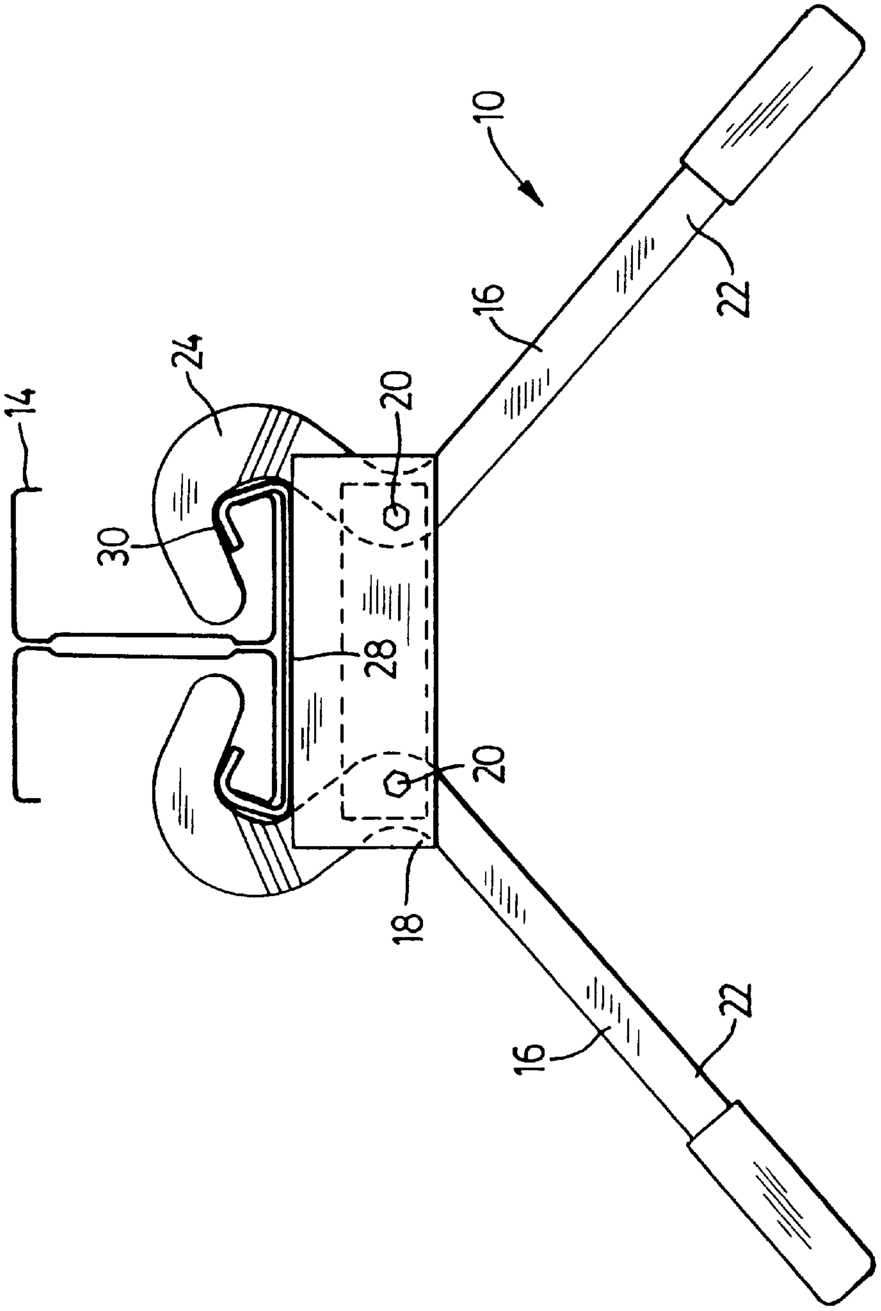
FIG. 3 is a view of the tool of FIGS. 1 and 2 in the closed position with the staple clinched about two side-by-side members.

FIGS. 1, 2 and 3 show a clinching tool 10 for clinching a staple 12 to wrap around two elongate members 14 to clamp them together. Staple 12 is formed of magnetisable material. The tool 10 comprises a pair of pincers 16 pivoted to a magnetic bar 18 by spaced apart pivots 20. Each pincer 16 comprises an elongate handle portion 22 and a jaw 24. Each pivot 20 passes through the magnetic bar 18 and through the pincer 16 between the handle portion 22 and the jaws 24. Backing bar 26 is provided to enhance stability of the pincers. The pincers 16 are sandwiched between the magnetic bar 18 and the backing bar 26 to pivot freely between them. The magnetic bar 18 is of a length sufficient to accommodate the web 28 of staple 12 thereon when the tool is in its open position with jaws 24 open as shown in FIG. 1. The staple 12 adheres firmly to the bar through magnetic force. Once the staple has been positioned in this way the tool may be turned into a horizontal position or even upside down to locate the staple 12 with its legs 30 about elongate members 14 which are to be joined together.

The jaws 24 are bent out of plane containing the handles 22 so that the jaws 24 line in a plane parallel to and slightly separated from a plane containing handles 22 to bring points of the jaws and the shaped part of the jaws into the same plane as magnetic bar 18 and staple 12. Thus, when the pincers are operated, the jaws close on staple 12 in the plane containing its legs. This arrangement facilitates accessing the staple. The distal ends of the jaws 24 are located adjacent legs 30 of staple 12 to press legs 30 together with minimum risk of vector forces dislocating the staple from its desired position. The arrangement may best be seen in FIG. 2.

When the handles 22 of tool 10 are moved apart by an operator, pincers 16 pivot on pivots 20 so that jaws 24 move towards one another with the legs 30 of the staple 12 sandwiched between them. Manual force tends to bend the legs 30 of staple 12 inwardly to wrap around members 14. Jaws 24 are curved inwardly to aid this effect. When manual force is used, this operation may be carried out as quickly are slowly as desired by the operator. The operation need not be completed to the point of tight clamping but may be stopped at an intermediate stage such that the members 14 are loosely held in position. Several staples may be located loosely to hold members 14. Final adjustment and tightening may be performed later if desired.

It is to be noted that if members 14 are thicker than the length of legs 30 of staple 12 and are formed of sufficiently soft material such as soft wood, the distal ends of legs 30 may be forced into the wood itself. This may be leave a bruise or indentation on the surface of the wood from the pincer action of jaws 24 (see FIG. 7).

Figure 4A:
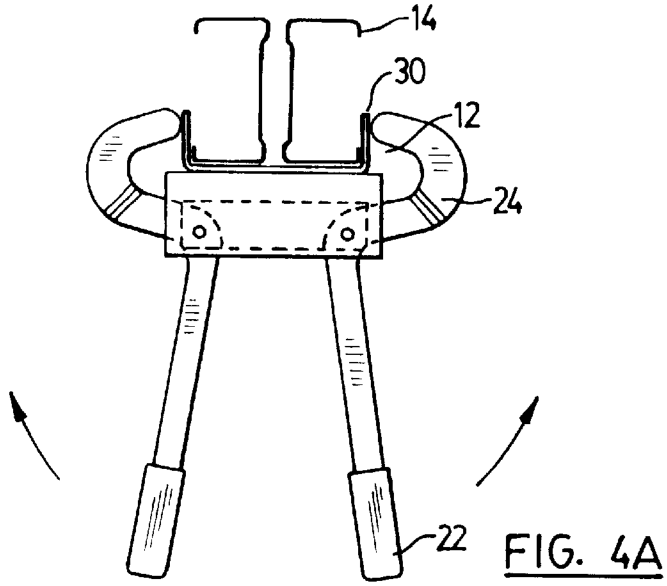
FIGS. 4A, 4B and 4C are schematic views showing progressive clinching of a staple.
Figure 4B:
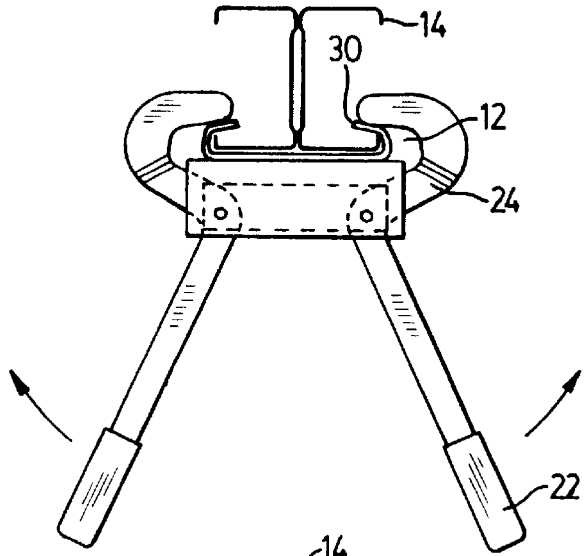
Figure 4C:
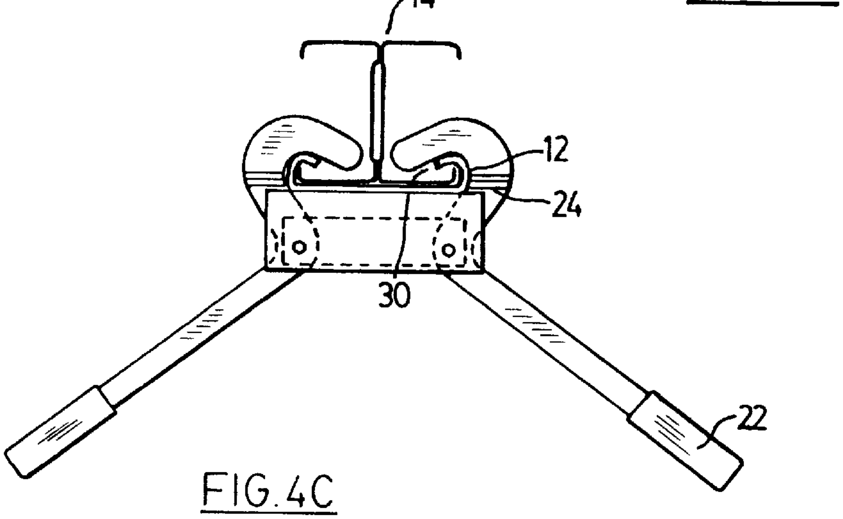

The progressive action of pincers 16 may be seen in FIGS. 4A, 4B and 4C which are schematic sketches. FIG. 4A shows the situation where staple 12 fits loosely about members 14 which may be back-to-back metal C-sections and which are not yet drawn together. To start clinching the staple the handles 22 may be moved outwardly in the direction of the arrows. FIG. 4B shows a mid-stage in tightening the staple 12 about members 14 showing the legs of the staple somewhat in-turned, the members 14 drawn together and the handles 22 in a mid-position. Further movement of the handles 22 in the direction shown by the arrows results in further tightening to achieve the position of FIG. 4C which shows the final position of members 14 tightly clamped together with staple 12 wrapped around their sides.

It will be appreciated from at least from sketches 4A, 4B and 4C that this process of clinching the staple 12 around members 14 may be controlled according to the desire of the operator. It may be done as quickly as manually possible or may be carried out slowly in a controlled manner. The amount of force which is exertable on the staple depends largely on the length of handles 22 but, if very great force is desired the operation may be carried out hydraulically or pneumatically.

Figure 6:
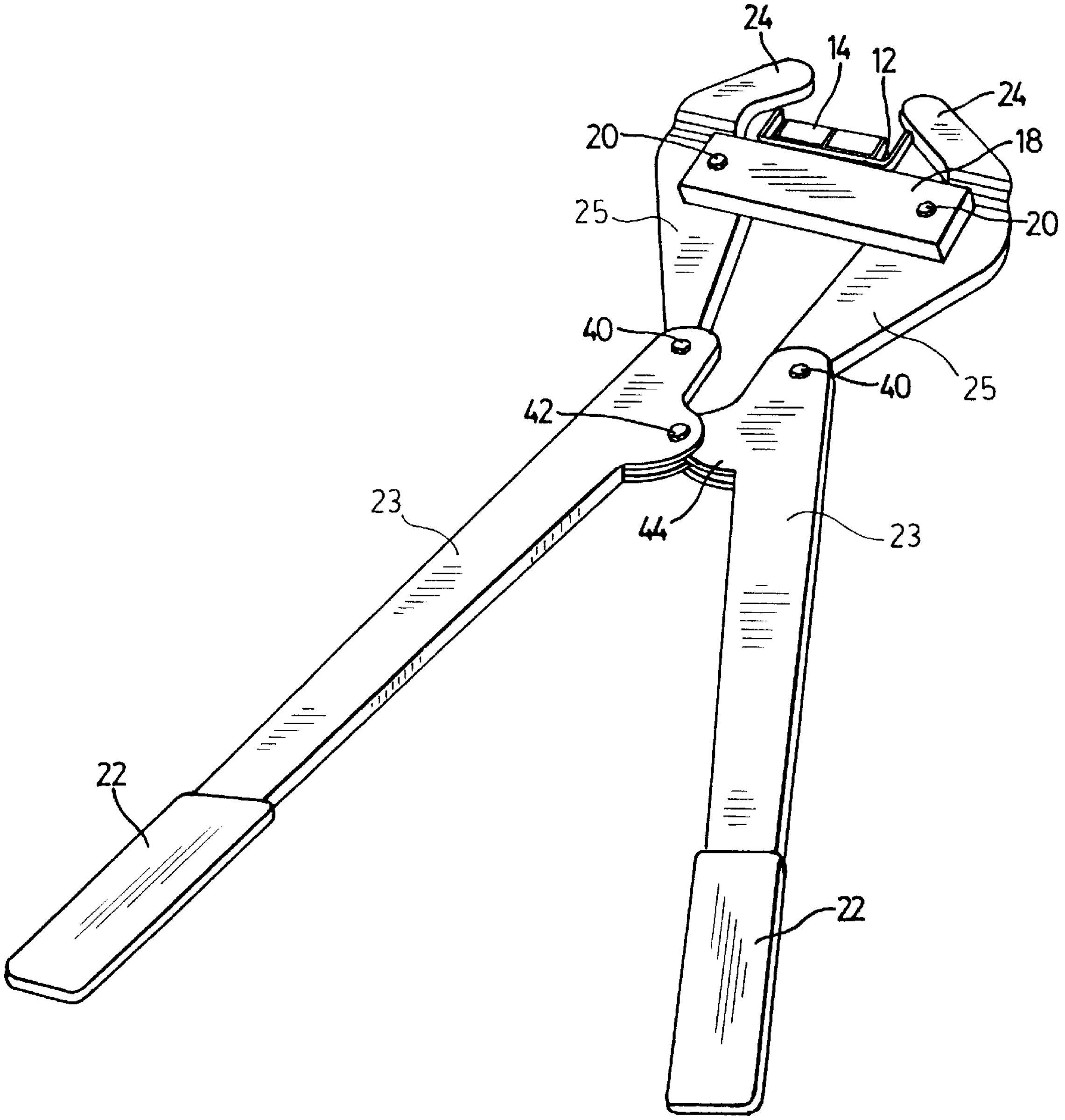
FIG. 6 shows another tool according to the invention in which the pincers are double-pivoted.

FIG. 6 shows another embodiment of a tool for clinching staples according to the method of the invention. It is generally believed that it is easier to utilize manual force by drawing handles together rather than pulling them apart. The tool illustrated in FIG. 6 is similar to the tool illustrated in FIGS. 1, 2 and 3 except that a double pivoting mechanism is utilized so that manual force used to draw handles 22 together operates also to move clinching jaws 24 together to clinch staple 12 into position.

In this case handle extensions 23 are pivoted to the proximal ends of clamping jaw extension 25 at pivots 40. Handles 22 are also pivoted to each other by pivot 42 through extension lugs 44. Between the clinching jaw 24 and the jaw extension 25 magnetic bar 18 is located pivoted at each end portion of the bar at pivots 20 to clinching jaws 24. When handles 22 are drawn together they pivot at pivot 42 to move pivots 40 apart from one another and thus move proximal ends of clinching jaws 24 apart from one another. Clinching jaws 24 in turn, pivot about pivots 20 to move their distal ends closer together to exert clinching force on staple 12 and tighten or clamp members 14 together.

By the use of a tool as illustrated FIGS. 1–3 or in FIG. 6 it may be seen that it is possible to fit two members 14 loosely together at a mid-stage of clinching such as that shown in FIG. 4B. A number of staples may be semi-fitted in this mid-stage so as locate members 14 in the desired position. Final clamping may be carried out thereafter.

Figure 5:
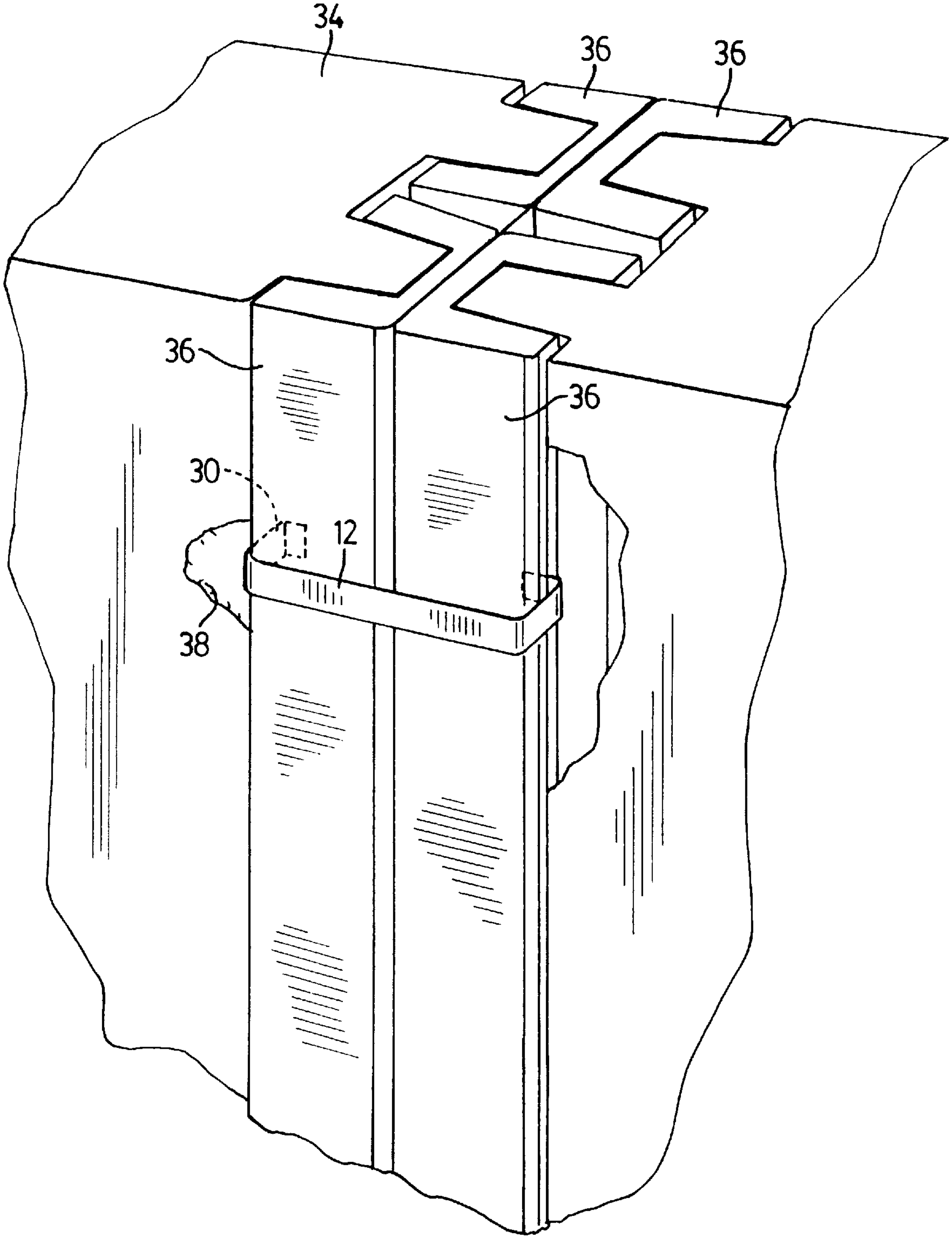
FIG. 5 shows prefabricated wall panels, vertical members of which are stapled together by a method according to the invention.

FIG. 5 shows a staple 12 which has been applied to the vertical members 36 of prefabricated wall panels such as those of the building system described and claimed in U.S. patent application Ser. No. 08/851,037 now U.S. Pat. No. 5,970,672 referred to earlier. The prefabricated wall panels comprise sheets 34 of rigid polystyrene insulation framed at each side by two rigid vertical steel structural members 36 which are separated by a thermal break. When the wall panels are assembled in a building in vertical position, vertical structural members 36 are drawn closely together and tightened into position. This may be carried out by clinching staples 12 thereabout using a tool as described with reference to FIGS. 1, 2 and 3 or described with reference to FIG. 6. The jaws 24 of the tool 10 may leave marks 38 on the surface of the polystyrene foam but this is not of importance since this will be later covered by drywall.

Figure 7:
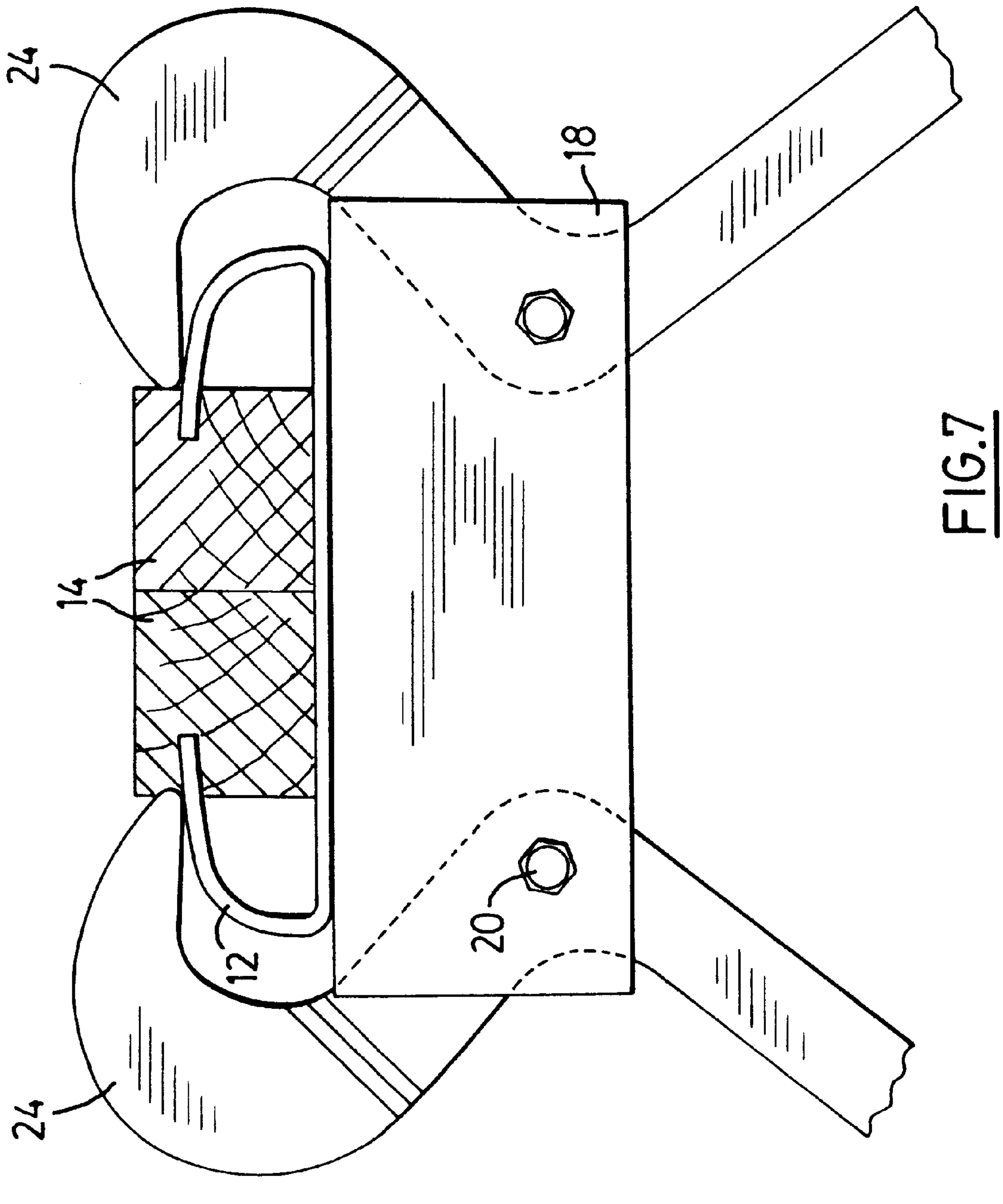
FIG. 7 shows a staple applied by a method according to the invention into thick members to be joined together.

FIG. 7 is a simple sketch showing the action of clinching a staple into soft material such as soft wood which is thicker than the depth of legs 30 of staple 12.

I claim:

1. A tool for clinching staples about a pair of members to tighten them together, the tool comprising a pair of pincers, each pincer having a jaw and an elongate handle, each pincer being pivoted between its jaw and handle to a rigid bar at opposite end portions of the bar; the bar having a length corresponding to the length of the web of a staple to be used therewith, and having means to hold the web of the staple there against when the jaws of the pincers are oriented in an open position; the jaw of each pincer being shaped to deform legs of the staple inwardly towards one another when the pincers are pivoted towards a closed position to exert pressure against the legs of the staple with the shaped jaws;

wherein the pincers are sandwiched between said rigid bar and a backing bar.

2. A clinching tool as claimed in claim 1 in which the bar is magnetic for use with magnetisable staples.

3. A clinching tool as claimed in claim 1 in which each pincer is pivoted to the bar through a single pivot whereby movement of the handles to widen an angle between them causes closing of the jaws.

4. A clinching tool as claimed in claim 1 in which each jaw is pivoted to the bar at a jaw pivot and a jaw extension extends between the jaw pivot and a handle extension which merges into the handle, the jaw extension being attached to the handle extension through a connecting pivot, and the handles are pivoted one to the other generally at a pivot where the handle extension merges into the handle, whereby movement of the handles to narrow an angle between them causes closing of the jaws.

5. A clinching tool as claimed in claim 1 in which the jaws lie in a plane parallel to and slightly spaced from a plane containing handles.

* * * * *